United States Patent Office 3,173,857
Patented Mar. 16, 1965

3,173,857
REFORMING PROCESS AND CATALYST
THEREFOR
Vladimir Haensel, Hinsdale, Ill., assignor to Universal Oil
Products Company, Des Plaines, Ill., a corporation of
Delaware
No Drawing. Filed Mar. 19, 1963, Ser. No. 266,213
8 Claims. (Cl. 208—139)

This application is a continuation-in-part of my co-pending application Serial Number 59,176, filed September 29, 1960, now abandoned. The invention described herein is directed toward a process for the catalytic reforming of hydrocarbons and various mixtures of hydrocarbons including hydrocarbon fractions and distillates. More specifically, the present invention affords an improvement, as well as unexpected advantages, in a catalytic reforming process through the utilization of a particular catalyst which has been manufactured in accordance with a specific and novel method of preparation. The catalyst resulting in the improvement in the process of reforming hydrocarbons is a composite of a fluoride-free refractory inorganic oxide, a platinum-group metallic component and combined chloride, the latter being the sole halogen component of said catalyst.

Catalytic reforming processes have attained extensive commercial utility among industries such as the heavy chemical, petrochemical, and particularly within the petroleum industry, etc. These reforming processes encompass a multitude of reactions among which are hydrogenation, cyclization, polymerization, cracking, dehydrogenation, alkylation, hydrocracking and isomerization. In particular instances, and under certain conditions of operation, the catalytic reforming process may be specifically tailored to effect a single reaction or a particular combination of two or more of the aforementioned reactions. Whatever the particular industry and the particular reactions to be effected, it is extremely essential, for acceptable commercial utility, that the particular catalyst employed therein exhibits a high degree of activity, as well as stability, or the capability to perform its intended function over a prolonged period of time. For example, as encountered within the petroleum industry, a process for the catalytic reforming of hydrocarbons and mixtures of hydrocarbons involves three major reactions, in addition to other concomitant reactions occurring to a somewhat lesser extent. In such a process, the primary object is to dehydrogenate the naphthenic hydrocarbons within the charge stock to produce aromatics, to dehydrocyclicize the straight-chain paraffinic hydrocarbons to form aromatics, and to effect a controlled degree of hydrocracking which is selective both with respect to the quality and quantity thereof. Also occurring, but to a lesser extent, are various reactions such as isomerization, hydrogen transfer, dimerization, disproportionation, etc. A successful catalytic reforming process is one which effects a proper balance among these reactions, and is dependent to a great extent upon the particular catalytic composite employed to promote the various reactions.

Relatively recent developments within the petroleum industry have indicated that catalytic reforming processes are more advantageously effected through the utilization of a catalyst comprising at least one platinum-group metallic component. Although the prior art abounds in a multitude of descriptions of such catalytic composites, and the various methods employed for the manufacture thereof, the precise mechanism of catalysis, in regard to particular reactions, is not fully understood, and the ultimate results of any process which utilizes a particular catalyst are difficult to predict with accuracy. In addition, various manufacturing procedures have been formulated for the purpose of developing catalytic composites which enhance the degree of activity and stability possessed by the particular catalytic composite while effecting a particular series or combination of reactions.

The object of the present invention is to provide an improvement in a process for the catalytic reforming of hydrocarbons through the utilization of a particular catalytic composite manufactured in a particular manner. A related object is to provide a procedure for the preparation of a platinum-containing catalyst having a degree of activity and stability, or capability to function for an extended period of time, which have heretofore not been obtained.

In a broad embodiment, the present invention relates to an improvement in a process for the reforming of hydrocarbons, in which process a hydrocarbon charge is contacted, at hydrocarbon-reforming conditions, with a catalytic composite of a platinum-group metallic component, a refractory inorganic oxide and combined halogen, which improvement comprises contacting said hydrocarbon charge, at hydrocarbon-reforming conditions, with a fluoride-free catalytic composite of a platinum-group metallic component, a refractory inorganic oxide and combined chloride, said catalytic composite characterized by the method of manufacture comprising initially preparing a refractory inorganic oxide, calcining said inorganic oxide, combining a platinum-group metallic component and chlorine with the calcined inorganic oxide, drying the resulting composite and thereafter oxidizing the dried composite at a temperature within the range of from about 400° F. to about 600° F. for a period of at least about one hour, increasing the oxidizing temperature to a level within the range of from about 700° F. to about 1000° F. and further oxidizing said composite for an additional period of at least one hour at the elevated temperature, the thus treated catalytic composite containing combined chloride in an amount of from about 0.75% to about 1.5% by weight, calculated as elemental chlorine and being the sole halogen component of said catalytic composite.

A more limited embodiment of the present invention affords an improvement in a process for the reforming of hydrocarbons, in which process a hydrocarbon charge is contacted, at hydrocarbon-reforming conditions, with a catalytic composite of platinum, alumina and combined halogen, which improvement comprises contacting said hydrocarbon charge, at hydrocarbon-reforming conditions, with a fluoride-free catalytic composite of platinum, alumina and combined chloride; said catalytic composite further characterized by the method of manufacture comprising initially preparing alumina, calcining said alumina, impregnating the calcined alumina with a platinum-chlorine compound in an amount to combine from about 0.01% to about 2.0% by weight of platinum therewith, drying the resulting composite and thereafter oxidizing the dried composite at a temperature within the range of about 400° F. to about 600° F. for a time sufficient to decrease the volatile matter content thereof to a level below about 5.0% by weight, increasing the oxidizing temperature to a level within the range of from about 700° F. to about 1000° F. and oxidizing said composite at the higher temperature for a time sufficient to further decrease the volatile matter content to a level below about 2.0% by weight, the thus treated catalytic composite containing combined chloride in an amount of from about 0.75% to about 1.5% by weight, calculated as elemental chlorine, and being the sole halogen component of said catalytic composite.

From the foregoing embodiments, it is seen that the reforming process of the present invention utilizes a catalytic composite of a platinum-group metallic component, a refractory inorganic oxide and halogen. It is recognized that the prior art relating to the reforming of hydrocarbons is replete with descriptions of a multitude of catalysts for utilization therein, and further, it is acknowledged by the prior art that the halogen may be selected from the group of fluorine, chlorine, bromine, and iodine. The prior art teaches that the use of halogen, in some combined form with the other components of the catalytic composite, imparts a particular acid-acting function to the catalyst, whereby the same exhibits the propensity to be selective in the quality and quantity of hydrocracking which is effected. The various members of the halogen family are considered to be equivalent, and it is especially acknowledged that fluorine, chlorine, and mixtures thereof are substantially equivalent for this purpose, and especially when used in a reforming catalyst. To the contrary, I have now found that the members of the halogen family are not, in fact, equivalent, and further, there appears to be a certain degree of criticality attached to the concentration of combined halogen within the catalyst. The particular halogen employed is extremely important from the standpoint of imparting a high degree of activity, and particularly stability to the composite. As hereinafter indicated, fluorine is not equivalent to chlorine, and the exclusion of fluorine, coupled with a particular method of manufacture, results in a catalyst having a degree of activity and stability (the capability to function for an extended period of time), respecting use in a process for catalytic reforming, which have heretofore not been obtained.

As hereinabove set forth, the process of the present invention utilizes a catalyst containing a platinum-group metallic component. Although the process of the present invention is specifically directed to the use of a catalytic composite containing platinum, it is intended to include other platinum-group metals such as palladium, rhodium, ruthenium, osmium and iridium. The platinum-group metallic component, such as platinum, may exist, within the final catalytic composite, as the halide, oxyhalide, oxide, sulfate, sulfide, sub-sulfide, etc. It is understood that the benefits afforded to processes utilizing catalysts containing different metallic components are not equivalent, and that the effects of employing the method of the present invention with a particular metallic component or mixture of metallic components, or a mixture of various compounds thereof, are not necessarily the same effects observed with respect to other metallic components, or mixtures of metallic components. Generally, the amount of the metallic component composited with the catalyst is small compared to the quantities of the other components combined therewith. For example, platinum and/or palladium, or other metals from the platinum-group, will generally comprise from about 0.01% to about 5.0% by weight of the total catalyst, and usually from about 0.1% to about 2.0% by weight. The use of the other metallic components, with or without platinum, is dependent upon the use for which the particular catalyst is intended. In any case, however, the concentrations of the metallic components will be small, and will generally be within the range of from about 0.01% to about 2.0% by weight of the total catalytic composite.

Whatever the metallic component, it is generally composited with a highly refractory inorganic oxide such as alumina, silica, zirconia, magnesia, boria, thoria, titania, strontia, etc., and mixtures of two or more including silica-alumina, alumina-boria, silica-thoria, silica-alumina-zirconia, etc. It is understood that the refractory inorganic oxides hereinabove set forth are intended to be illustrative rather than limiting unduly the process of the present invention. It is further understood that these refractory inorganic oxides may be manufactured by any suitable method including separate, successive, or co-precipitation methods of manufacture, or they may be naturally-occurring substances such as clays or earths which may or may not be purified or activated with special treatment. The preferred refractory inorganic oxide for utilization in the process of the present invention comprises alumina, either in admixture with other of the aforementioned refractory oxides, or as the sole component of the refractory material selected to serve as the carrier for the catalytically active metallic components. In the present specification and appended claims, the term alumina is employed to mean porous aluminum oxide in all states of oxidation and in all states of hydration, as well as aluminum hydroxide. The alumina may be synthetically prepared or naturally occurring, and it may be of the crystalline or gel type. Whatever type of alumina is employed, it may be activated prior to use by one or more treatments including drying, calcining, steaming, etc. It may be in a form known as activated alumina, activated alumina of commerce, porous alumina, alumina gel, etc. The various forms of alumina are known by many trivial and trade names, and it is intended to include all such forms. In one of the more limited embodiments, directed toward the method of manufacturing the catalytic composite for use in the reforming process of the present invention, the alumina is synthetically prepared, and subjected to a particular oxidizing, or calcination, technique employed to facilitate the deposition of platinum and the combined chloride therewith.

The alumina may be prepared by adding a suitable alkaline reagent such as ammonium hydroxide to a salt of aluminum such as aluminum chloride, aluminum nitrate, etc., in an amount to form aluminum hydroxide which, upon drying, is converted to alumina. The alumina may be formed into any desired shape such as spheres, pills, extrudates, powder, granules, etc. A preferred form of alumina is the sphere, and alumina spheres may be continuously manufactured by passing droplets of an alumina hydrosol into an oil bath maintained at an elevated temperature, the droplets being retained in said oil bath until they set to firm hydrogel spheroids. The spheres are continuously withdrawn from the oil bath and immediately thereafter subjected to specific aging treatments, in an ammoniacal solution, to impart certain desired physical characteristics thereto. Following a drying procedure, at a temperature of about 200° F., to remove the greater proportion of excess moisture therefrom, the spheres are subjected to a specific calcination procedure which appears to result in surface and structure characteristics which render the alumina more susceptible to the thorough penetration and more permanent deposition of the other catalytic components. The dried alumina is calcined initially at a temperature of from about 850° F. to about 1050° F. for a period of at least about one hour, and thereafter at an elevated temperature of about 1100° F. to about 1400° F., and for a time sufficient to decrease the volatile matter content of the calcined alumina to a level below about 2.0% by weight.

With respect to reforming catalysts comprising a platinum-group metallic component and halogen, the prior art teaches that the halogen is generally composited with the catalyst in concentrations of from about 0.01% to about 8.0% by weight of the total catalyst, and that such halogen may be either fluorine, chlorine, iodine, bromine, or mixtures of the same. It would appear that fluorine and chlorine, particularly fluorine, are less easily removed from the catalytic composite during the manufacture thereof, and further during the reforming process in which the catalyst is employed, and, therefore, it is stated that fluorine, or a mixture of chlorine and fluorine, are preferred in many instances. To the contrary, I have found that the halogen may be composited with the catalyst in such a manner that it is not easily removed from the catalyst during processing, and further that benefits are afforded the process of reforming of hydrocarbons when such halogen consists solely of combined chloride.

The chloride may be added to the calcined carrier material, such as alumina, in any suitable manner, and either before or after the addition of the catalytically active metallic components, or simultaneously therewith. The chlorine may be added as an aqueous solution of hydrogen chloride, as aluminum chloride, or through the utilization of a volatile salt such as ammonium chloride. At least a portion of the chlorine may be composited with the alumina during the impregnation of the latter with the active metallic component, for example, through the utilization of chloroplatinic acid, chloroplatinous acid, etc. An essential feature of the method employed for preparing the reforming catalyst of the present invention, is the treatment of the carrier material following the deposition of the chlorine component. As in the preparation of the alumina, this particular treatment is directly concerned with the method utilized in subjecting the composite to drying and subsequent oxidation. Thus, the catalyst is initially dried at about 200° F., and the dried composite is oxidized, or calcined, initially at a temperature within the range of from about 400° F. to about 600° F. for a period of at least about one hour, until the volatile matter content thereof is decreased to a level below about 5.0% by weight. The oxidizing temperature is then increased to a level within the range of about 700° F. to about 1000° F., and the composite is further oxidized at the elevated temperature for an additional period of at least about one hour, until the volatile matter content of the final catalytic composite is decreased to a level below about 2.0% by weight. Although the precise effect of this particular calcination treatment is not accurately known, it is believed that the greater proportion of the chlorine component is caused to combine with the alumina and the platinum-group metallic component in such a manner that it is not easily removed from the catalyst. Generally, reforming catalysts of this type are manufactured to contain about 0.35% by weight of chlorine, and about 0.35% by weight of fluorine. Following the period of operation during which this type of catalyst is subjected to a liquid charge under elevated temperature and pressure, it is found that the greater proportion of the chlorine component has been removed. Several disadvantages inherently result after the chlorine component has been removed from the catalyst, and also appear to be inherent when the catalytic composite originally contains only fluorine as the halogen component. The fluorine component results in a greater degree of undesirable hydrocracking when the reforming process is effected in the presence of water in concentrations as low as about 10 parts per million, and further appears to be more sensitive to the severe conditions encountered when operating at relatively elevated temperatures and pressures; chlorine does not exhibit hydrocracking tendencies in the presence of water to as great a degree. In accordance with the catalyst manufacturing procedure hereinafter set forth, the reforming catalyst has composited therewith combined chloride in an amount of from about 0.75% to about 1.5% by weight, calculated as elemental chlorine, and is the sole halogen component of the catalytic composite. As hereinafter indicated, this catalyst has an unusually high degree of activity, and the necessary stability to function acceptably for an extended period of time as a result of the fact that the greater proportion of the chlorine component is not readily removable therefrom. An unexpected result of the relatively high chlorine-containing catalyst is that the catalyst appears to be extremely selective in the quality and quantity of hydrocracking which is effected. This obviously results in a greater increase in the volumetric yield of normally liquid, debutanized product effluent.

Although the precise means by which the platinum component, or other platinum-group metal, is incorporated with the other components of the catalyst, is not known, it is believed that the platinum exists in some physical association or as a chemical complex therewith. Thus, the platinum-group metal may be present as such, or as a chemical compound or in physical association with the alumina or with the other catalytically active metallic components, or in some combination with both. It is, however, believed that the chlorine, the platinum-group metallic component and the refractory inorganic oxide, such as alumina, exist in the form of a complex compound. The method of preparing the catalyst of the present invention is facilitated through the utilization of water-soluble compounds of the platinum-group metals, with which the carrier material is combined via an impregnating technique. Thus, where the platinum-group metal is platinum, it may be added to the carrier material by commingling the latter with an aqueous solution of chloroplatinic acid. Other water-soluble compounds of platinum may be utilized within the impregnating solution, and include ammonium chloroplatinate, platinous chloride, platinic chloride, dinitrito-diamino-platinum, etc. The utilization of a platinum-chlorine compound, such as chloroplatinic acid, is preferred since it facilitates the incorporation of both the platinum component and at least a minor quantity of the chlorine component in a single step. Hydrochloric acid may be employed in admixture with the chloroplatinic acid, to incorporate the requisite quantity of combined chloride. Following the impregnating technique, the carrier material is dried and subjected to the high-temperature calcination, or oxidation, procedure as hereinbefore set forth.

A distinction must necessarily be made between the terms, "drying," "oxidizing" and "calcination," notwithstanding that the latter two terms are often employed synonymously. "Drying" is defined as the removal of physically-held water (often referred to as "excess water of hydration") and is effected at a temperature below about 400° F., and preferably below 210° F. The drying must be effected at a low temperature level in order to avoid upsetting the structure of the catalyst particles, and to insure against inducing reactions between and among the various components of the catalyst. If the drying procedure is eliminated, a great quantity of the physically-held water will be removed suddenly during the high-temperature oxidation, resulting not only in severe rupture of the catalyst particles, but also in the removal of a sufficient amount of the desired quantity of combined chloride. Furthermore, the presence of excessive moisture at the elevated temperature induces reactions between the components of the catalyst such that the ultimate activity thereof is adversely affected. To distinguish further "drying" from "oxidizing," the former may be effected in a reducing atmosphere such as hydrogen, or in an atmosphere of hydrogen sulfide, carbon monoxide, etc., with the result, however, that a virtually completely inactive catalyst is produced, notwithstanding a subsequent high-temperature oxidation. An acceptable platinum-alumina composite, intended for use in a catalytic reforming process, can only be prepared under high-temperature oxidizing conditions, following the removal of excess water at a low temperature.

In order to "fix" the various components of the catalyst, a high-temperature treatment, following the drying of the composite, is required; this treatment, effected at temperatures within the range of about 400° F. to about 1000° F., is commonly referred to as "calcination." When calcining in an atmosphere of air, or other oxygen-containing gas, the treatment is high-temperature oxidation. Notwithstanding the presence of oxygen at temperatures below 400° F., and/or during the "drying" of the composite, "calcination," or "oxidizing," will not be effected in the sense that chemically-bound water (as distinguished from physically-held water), will not be removed. Furthermore, oxidation and changes in the structure of the composite, induced at elevated temperatures, will not take place at the lower temperature.

Briefly, the method of manufacturing the catalytic composite for utilization in the reforming process of the present invention, commences with the preparation of the refractory inorganic oxide carrier material, which carrier material is preferably alumina. The particularly preferred form of alumina is the sphere, and the alumina spheres may be continuously manufactured by the well-known oil-drop method. This method is described in detail in U.S. Patent No. 2,620,314, issued to James Hoekstra. Following the formation of the alumina spheres, and the subsequent drying thereof to remove excessive water resulting from the various steps of the sphere formation procedure, the spheres are subjected to high-temperature calcination, or oxidation, initially at an elevated temperature of from about 850° F. to about 1050° F. This initial calcination procedure is effected for a period of at least about one hour, after which the temperature is increased to a level of about 1100° F. to about 1400° F., at which temperature the spherical alumina particles are further calcined until the volatile matter content thereof is decreased to a level below about 2.0% by weight. The calcined spheres are then intimately commingled with an aqueous solution of a platinum-chlorine compound, preferably chloroplatinic acid, the latter being employed in an amout to result in a final catalytic composite comprising from about 0.01% to about 2.0% by weight of platinum. After the impregnated composite has been dried at a relatively low temperature below about 400° F., and preferably at about 210° F., or lower, to remove physically-held water therefrom, the temperature is increased to a level within the range of about 400° F. to about 600° F., and the composite oxidized, or calcined, at this temperature for a time sufficient to remove chemically-bound water, and to decrease the volatile matter content thereof to a level below about 5.0% by weight. The calcination temperature is increased to a higher level within the range of from 700° F. to about 1000° F., and the procedure continued for a time sufficient to remove additional chemically-bound water, and to further decrease the volatile matter to a level below about 2.0% by weight. The final catalytic composite will contain combined chloride, calculated as the element, in an amount of from about 0.75% to about 1.5% by weight, which combined chloride is the sole halogen component of the catalytic composite. To facilitate the deposition of the requisite quantity of chlorine, hydrogen chloride, or other chlorine-containing water-soluble compounds may be employed in conjunction with the chloroplatinic acid during the impregnating technique. In addition to possessing an unusual degree of activity in effecting the reforming of hydrocarbons and mixtures of hydrocarbons, the all-chloride catalyst, prepared as hereinabove set forth, appears to be of a physical and/or chemical structure such that the greater proportion of the combined chloride tends to remain composited with the catalyst during the reforming process, which effect is not experienced with the catalytic composites of the prior art.

The following examples are given to illustrate the method of preparing the catalyst for use in the reforming process of the present invention, and to indicate the benefits afforded the catalytic reforming of hydrocarbons and mixtures of hydrocarbons through the utilization of such catalytic composites. It is not intended that the catalytic reforming process of the present invention be unduly limited to the operating conditions employed within the examples. The reforming reaction zone may be maintained at a temperature within the range of from about 800° F. to about 1050° F., and under an imposed pressure within the range of from about 300 pounds per square inch to about 900 pounds per square inch or more. The liquid hourly space velocity, defined as volumes of liquid hydrocarbon charge per hour per volume of catalyst disposed within the reaction zone, will generally lie within the range of from about 0.5 to about 10.0. The lower space velocities are generally preferred, usually in excess of about 0.5, having, however, an upper limit of about 6.0. The resulting catalytically reformed product is passed, in its entirety, into a separating zone for the purpose of removing a hydrogen-rich gaseous phase which is recycled to combine with the liquid hydrocarbon charge. This gaseous recycle is of an amount such that the mol ratio of hydrogen to hydrocarbons, entering the reaction zone, is within the range of from about 2:1 to about 20:1. In addition to the operating conditions, it is understood that the present invention is not to be unduly limited, beyond the scope and spirit of the appended claims, to the various reagents or concentrations thereof employed within the examples.

EXAMPLE I

A catalyst was prepared utilizing 1/16-inch alumina spheres, manufactured in accordance with U.S. Patent No. 2,620,314, issued to James Hoekstra, and containing 0.35% by weight of combined chloride. The spheres were intimately commingled with a sufficient quantity of an aqueous solution of hydrogen fluoride to composite therewith about 0.35% by weight of combined fluoride. The halide-containing spheres were then dried, and subjected to a single calcination procedure at a temperature of about 1250° F. The calcined spheres were impregnated with an aqueous solution of chloroplatinic acid in an amount to yield a final catalyst containing 0.75% by weight of platinum, calculated as the element thereof. The impregnated spheres were dried at a temperature of about 300° F., and thereafter calcined, in an atmosphere of air, at a temperature of about 900° F., for a period of about two hours until such time as the volatile matter content of the catalyst was below a level of about 2.0% by weight. This catalyst exemplifies the present-day, reforming-type catalysts containing platinum and combined halogen combined with a refractory inorganic oxide. In the following discussion and tables, this catalsyt is designated as catalyst "A," and is employed for the purpose of evaluating the all-chloride catalyst prepared in a particular manner as hereinafter set forth.

A second catalyst, hereinafter designated as catalyst "B," was prepared by forming an aluminum chloride hydrosol into 1/16-inch spheres by the oil-drop method set forth in U.S. Patent No. 2,620,314. The alumina spheres were dried at a temperature of about 400° F., and thereafter calcined, in an atmosphere of air, for a period of one hour at a temperature of 950° F. The calcination temperature was then increased to a level of 1265° F., and the calcination procedure continued at the elevated temperature for a period of two hours, until the volatile matter content of the alumina spheres had decreased to a level of 1.98% by weight. The calcined alumina spheres were then commingled, in a rotating evaporator, with water, hydrochloric acid, and sufficient chloroplatinic acid to composite 0.375% by weight of platinum therewith. On the basis of about 600 pounds of the 1/16-inch calcined alumina spheres, 136 gallons of water and 34.6 pounds of a 34.6% by weight of hydrochloric acid were added to the rotating evaporator. The alumina spheres were dried within the rotating evaporator at a steam pressure of about 50 pounds, for a period of six hours. The dried spheres were then subjected to high-temperature calcination, or oxidation, at a temperature of 550° F., for a period of one hour until the volatile matter content was 4.5% by weight. The temperature was then increased to a level of 932° F., and further oxidation was effected for a period of two hours, until the volatile matter content had decreased to a level of 1.7% by weight. As indicated in Table I, this catalyst was fluoride-free, and contained 0.375% by weight of platinum and 0.95% by weight of chloride, calculated as the element.

A third catalyst, hereinafter designated as catalyst "C," was prepared in accordance with the method hereinabove set forth in regard to catalyst "B," with the exception that sufficient chloroplatinic acid was employed during the impregnating technique to composite 0.750% by weight of platinum therewith. This catalyst was also fluoride-free, containing 0.95% by weight of combined chloride as the sole halogen component thereof.

The three catalyst portions were then subjected individually to a particular activity-stability test which comprises passing a standard hydrocarbon charge stock, having a boiling range of about 200° F. to about 400° F., through the catalyst at a liquid hourly space velocity (defined as volumes of hydrocarbon charged per volume of catalyst within the testing zone) of 2.0, in an atmosphere of hydrogen present in a mol ratio of hydrogen to hydrocarbon of 14:1, for a period of about 14 hours. The reaction zone is maintained at a temperature of 500° C., and under an imposed pressure of 500 pounds per square inch. The liquid product, from each reaction zone over the entire 14 hour period of the test, was analyzed for octane rating (F–1 Clear). The results of this standard relative activity test procedure are given in the following Table I:

Table I.—Standard relative activity test

| Catalyst Designation | A | B | C |
|---|---|---|---|
| Analysis, wt. percent: | | | |
| Platinum | 0.750 | 0.375 | 0.750 |
| Fluoride | 0.350 | 0 | 0 |
| Chloride | 0.350 | 0.95 | 0.95 |
| Total Halogen | 0.700 | 0.95 | 0.95 |
| Octane Rating of Product, F–1 Clear | 94.9 | 96.4 | 96.8 |
| Excess Receiver Gas, s.c.f./bbl | 828 | 858 | 918 |
| Excess Debutanizer Gas, s.c.f./bbl | 447 | 462 | 444 |
| Total Excess Gas, s.c.f./bbl | 1,275 | 1,320 | 1,362 |
| Debutanizer Gas Ratio | 0.351 | 0.350 | 0.326 |
| Activity Ratings: | | | |
| Debutanizer Overhead— | | | |
| At same Octane | 100 | 98 | 93 |
| At same Total Gas | 100 | 98 | 89 |
| Octane Number—Space Velocity | 100 | 112 | 119 |

For the purpose of obtaining a clear understanding of the data, several definitions of the terms employed in Table I are given below:

(1) The excess receiver gas is that quantity of gas in excess of the amount required to maintain the desired pressure within the reaction zone. Analyses have indicated, that this gas is, for all practical purposes, substantially pure hydrogen.

(2) The excess debutanizer gas is that gaseous product which is composed of light paraffins, methane, ethane, propane and butane, along with some hydrogen, and results primarily from the hydrocracking reactions being effected within the reaction zone.

(3) The debutanizer gas ratio is the ratio of excess debutanizer gas to the total excess gas, standard cubic feet per barrel, and is indicative of the relative yield of desirable liquid product within the effluent from the reaction zone; it is, to a certain extent, an indication of the relative stability of the catalyst. The lower the debutanizer gas ratio, the more active the catalyst for the purpose of effecting the reforming of hydrocarbons, and greater is the stability of the catalyst.

(4) The activity ratings are employed on a comparative basis with respect to the standard catalyst, namely catalyst "A"; they are first compared at identical octane ratings and total excess gas production, and at equivalent liquid hourly space velocities. In the latter instance, the larger the number, the more active the catalyst; in the former instances, the smaller the number, the greater the yield of the high-octane product.

The data presented in the foregoing Table I clearly indicate the unexpected benefits afforded a process for the catalytic reforming of hydrocarbons, through the utilization of the fluoride-free catalyst prepared in accordance with the method of the present invention. Heretofore it was believed, in the prior art relating to catalytic reforming, that the utilization of a halogen component was to impart an acid-acting function to the catalyst, and, for this purpose, the various members of the halogen family were equivalent; and further that the only criteria was the total quantity of halogen required to achieve the intended degree of hydrocracking. Generally, a preference was given to combined fluoride in view of its ability to remain as a catalytic component while the process was being effected.

Contrary to what would be expected, both the fluoride-free, all chloride catalysts, "B" and "C," produced a lesser quantity of excess debutanizer gas than catalyst "A," both at the same octane rating and at the same total excess gas production. Similarly, these catalysts indicated greater than 10% increase in space velocity activity. Upon comparing catalyst "C" with catalyst "A," both of which contained the same quantity of platinum, but varying quantities of halogen of different species, it is seen that catalyst "C" resulted in 7% less excess debutanizer gas, compared at the same octane rating, and exhibited a significantly lower debutanizer gas ratio, while at the same time producing a liquid product having a significantly greater octane rating. It is further significant that catalyst "C" contained approximately 0.25% by weight additional halogen which, according to prior knowledge, should have resulted in a greater degree of hydrocracking, in turn resulting in a higher debutanizer gas ratio: unexpectedly, the activity ratings relative to excess debutanizer gas, indicate the contrary.

The three catalysts, hereinbefore described, were subjected individually to a second test procedure designed to evaluate the stability of the catalyst over an extended period of time. This secondary evaluation test procedure involves the utilization of a light naphtha having a boiling range from about 160° F. to about 260° F., and is effected at operating conditions specifically designed to induce a slight instability to the operation. The catalyst is maintained at a pressure of 300 pounds per square inch and the charge is passed therethrough at a liquid hourly space velocity of 1.5, in the presence of hydrogen in an amount to yield a mol ratio of 12:1. The test procedure is effected for a period of approximately 150 hours or more, varying the operating temperature to maintain an octane rating, on the pentanes-and-heavier portion of the product effluent, of 100.0 (F–1 Clear). The various results are plotted against time, and the relative activity and selectivity is determined by comparing the data to that resulting from the reference catalyst. The relative stability of the catalysts are determined by comparing the slope of the various plots at 100 hours, to the slope of the reference catalyst at 100 hours. The data resulting from the extended stability test are given in the following Table II:

Table II.—Extended stability test, stability @ 100 hours

| Catalyst Designation | A | B | C |
|---|---|---|---|
| Block Temperature, ° F | 1,022 | 1,000 | 996 |
| Excess Receiver Gas, s.c.f./bbl | 1,110 | 1,182 | 1,266 |
| Excess Debutanizer Gas, s.c.f./bbl | 461 | 423 | 357 |
| Total Excess Gas, s.c.f./bbl | 1,571 | 1,605 | 1,623 |
| Debutanizer Gas Ration | 0.293 | 0.264 | 0.220 |
| Yield, Pentanes and Heavier, Vol. Percent | 57.2 | 59.1 | 61.8 |

Here again, comparing catalysts "A" and "C," the benefits to be afforded the catalytic reforming of hydrocarbons is clearly ascertained. The all-chloride catalyst at the 100-hour comparison, required 25° F. less operating temperature while producing better than 4.0% greater volumetric yield of pentanes and heavier hydrocarbons. Of greater significance, however, is the lower debutanizer gas ratio exhibited by the all-chloride catalysts, compared to the catalyst containing combined fluoride. The results of the extended stability test are unusual, and totally unexpected from the teachings and results indicated within the prior art.

EXAMPLE II

A second extended stability test procedure was performed, comparing the platinum-chloride-fluoride catalyst with a catalyst containing 0.81% of chlorine by weight, as the sole halogen component thereof. This catalyst is designated in the following table as catalyst "D," and differs from catalyst "C" only in the slightly lower concentration of combined chloride. The extended stability operation was carried out for a total period of 185 hours at a liquid hourly space velocity of 1.5, an operating pressure of 300 pounds per square inch, and at a hydrogen to hydrocarbon mol ratio of about 7.5. The charge stock employed was a light naphtha having a boiling range from 168° F. to 275° F., and contained 76.0% paraffins, 17.0% naphthenes and 7.0% aromatics, on a volumetric basis. The operating temperature was subjected to change, throughout the total period of 185 hours, for the purpose of maintaining an octane rating, on the debutanized liquid product, of 100.0 F–1 Clear.

The two catalysts "A" and "D" were compared during the initial portion of the extended stability test, that is, at 41 hours, and at the end of the extended stability test, at 185 hours. The data obtained are presented in the following Table III, and indicate the benefits afforded the catalytic reforming of hydrocarbons, utilizing an all-chloride catalyst free from combined fluoride.

*Table III.—Extended stability test—185 hours @ 100.0 F–1 Clear*

| Catalyst Designation | A | D | A | D |
|---|---|---|---|---|
| Period Duration, Hours | 41 | 41 | 185 | 185 |
| Block Temperature, ° F | 1,025 | 1,020 | 1,036 | 1,016 |
| Severity Differential, ° F./Hr | | | 0.118 | 0.007 |
| Excess Receiver Gas, s.c.f./bbl | 1,288 | 1,378 | 1,008 | 1,204 |
| Excess Debutanizer Gas, s.c.f./bbl | 406 | 352 | 516 | 425 |
| Total Excess Gas, s.c.f./bbl | 1,694 | 1,730 | 1,524 | 1,629 |
| Debutanizer Gas Ratio | .240 | .204 | .336 | .261 |
| Yield, Pentanes and Heavier, Vol. Percent | 60.1 | 61.8 | 55.2 | 59.0 |
| Carbon Deposition, Wt. Percent | | | 5.39 | 3.59 |

The severity differential was obtained by computing the average slope of the temperature-time plot over the entire period of operation. This differential is indicative of the prospective catalyst life to be expected in terms of the stability of the catalyst.

From the foregoing data, it is readily ascertained that the all-chloride catalyst possesses a substantially greater degree of stability than the catalyst containing both combined chloride and combined fluoride. This is indicated by the severity differential of 0.007° F. per hour for the all-chloride catalyst, as compared to a temperature differential of 0.118° F. per hour. Furthermore, the volumetric yield of pentanes and heavier hydrocarbons decrease to the extent of about 5.0%, and only 2.8% for the all-chloride catalyst. In addition, and of great significance, is the fact that the all-chloride catalyst indicated a carbon deposition, as a result of the extended period of operation, of only 3.59% by weight, whereas the standard catalyst exhibited a carbon deposition of 5.39% by weight. Other comparisons may be made from the data presented in Table III, and these comparisons will indicate the greater degree of stability and activity possessed by the all-chloride catalyst.

The foregoing specification clearly sets forth the method employed for manufacturing a catalyst for utilization in the catalytic reforming of hydrocarbons and mixtures thereof. The benefits afforded the reforming process are clearly ascertained from the data obtained as a result of the activity testing procedures performed on a typical reforming-type catalyst, and the catalyst manufactured in the particular manner hereinbefore set forth.

I claim as my invention:

1. In a process for the reforming of hydrocarbons, in which process a hydrocarbon charge is contacted, at hydrocarbon-reforming conditions, with a catalytic composite of a platinum-group metallic component, a refractory inorganic oxide and combined halogen, the improvement which comprises contacting said hydrocarbon charge, at hydrocarbon-reforming conditions, with a fluoride-free catalytic composite of a platinum-group metallic component, a refractory inorganic oxide and combined chloride, said catalytic composite characterized by the method of manufacture comprising initially preparing a refractory inorganic oxide, calcining said inorganic oxide, combining a platinum-group metallic component and chlorine with the calcined inorganic oxide, drying the resulting composite at a temperature below about 400° F. to remove physically held water therefrom, thereafter oxidizing the dried composite at a temperature within the range of from about 400° F. to about 600° F. for a period of at least about one hour, increasing the oxidizing temperature to a level within the range of from about 700° F. to about 1000° F. and further oxidizing said composite for an additional period of at least about one hour at the elevated temperature, the thus treated catalytic composite containing combined chloride in an amount of from about 0.75% to about 1.5% by weight, calculated as elemental chlorine, and being the sole halogen component of said catalytic composite.

2. The improvement of claim 1 further characterized in that said platinum-group metallic component comprises platinum.

3. The improvement of claim 1 further characterized in that said platinum-group metallic component comprises palladium.

4. In a process for the reforming of hydrocarbons, in which process a hydrocarbon charge is contacted, at hydrocarbon-reforming conditions, with a catalytic composite of platinum, alumina and combined halogen, the improvement which comprises contacting said hydrocarbon charge, at hydrocarbon-reforming conditions, with a fluoride-free catalytic composite of a platinum component, alumina and combined chloride, said catalytic composite further characterized by the method of manufacture comprising initially preparing alumina, calcining said alumina, combining the platinum component and chlorine with the calcined alumina, drying the resulting composite at a temperature below about 400° F. to remove physically held water therefrom, thereafter oxidizing the dried composite at a temperature within the range of from about 400° F. to about 600° F. for a period of at least about one hour, increasing the oxidizing temperature to a level within the range of from about 700° F. to about 1000° F. and further oxidizing said composite at the elevated temperature for an additional period of at least about one hour, the thus treated catalytic composite containing combined chloride in an amount of from about 0.75% to about 1.5% by weight, calculated as elemental chlorine, and being the sole halogen component of said catalytic composite.

5. The improvement of claim 4 further characterized in that said fluoride-free catalytic composite contains from about 0.01% to about 2.0% by weight of platinum.

6. The improvement of claim 4 further characterized in that said calcined alumina is impregnated with a platinum-chlorine compound in an amount to composite from about 0.01% to about 2.0% by weight of platinum therewith.

7. In a process for the reforming of hydrocarbons, in which process a hydrocarbon charge is contacted, at hydrocarbon-reforming conditions, with a catalytic composite of platinum, alumina and combined halogen, the improvement which comprises contacting said hydrocarbon charge, at hydrocarbon-reforming conditions, with a fluoride-free catalytic composite of platinum, alumina and combined chloride, said catalytic composite further characterized by the method of manufacture comprising initially preparing alumina, calcining said alumina, impregnating the calcined alumina with a platinum-chlorine compound in an amount to combine from about 0.01% to about 2.0% by weight of platinum therewith, drying the resulting composite at a temperature below about 400° F. to remove physically held water therefrom, thereafter oxidizing the dried composite at a temperature within the range of about 400° F. to about 600° F. for a time sufficient to decrease the volatile matter content thereof to a level below about 5.0% by weight, increasing the oxidizing temperature to a level within the range of from about 700° F. to about 1000° F. and oxidizing said composite at the higher temperature level for a time sufficient to further decrease the volatile mater content to a level below about 2.0% by weight, the thus treated catalytic composite containing combined chloride in an amount of from about 0.75% to about 1.5% by weight, calculated as elemental chlorine, and being the sole halogen component of said catalytic composite.

8. The improvement of claim 7 further characterized in that said alumina is calcined initially at a temperature of from about 850° F. to about 1050° F. for a period of at least about one hour, and thereafter at an elevated temperature of about 1100° F. to about 1400° F. to decrease the volatile matter content of said alumina to below about 2.0% by weight.

References Cited by the Examiner
UNITED STATES PATENTS

| | | | |
|---|---|---|---|
| 2,479,110 | 8/49 | Haensel | 208—139 |
| 2,708,187 | 5/55 | Kearby | 208—138 |
| 2,884,382 | 4/59 | Oleck | 252—442 |
| 2,940,924 | 6/60 | Brennen et al. | 208—138 |
| 2,948,672 | 8/60 | Brennen | 208—139 |
| 3,002,918 | 10/61 | Lang | 208—138 |

ALPHONSO D. SULLIVAN, *Primary Examiner.*